Oct. 20, 1959        P. F. MARSHALL        2,909,003
GRASS SEED MAT AND PROCESS FOR MAKING SAME
Filed Nov. 30, 1955

INVENTOR.
Preston F. Marshall
BY
John E. Herzihy
Attorney

2,909,003

GRASS SEED MAT AND PROCESS FOR MAKING SAME

Preston F. Marshall, East Walpole, Mass., assignor to The Kendall Company, Boston, Mass., a corporation of Massachusetts Application November 30, 1955, Serial No. 550,054

9 Claims. (Cl. 47—56)

This invention relates to a novel seed carrier and is particularly directed to that type of seed carrier which is used to produce an even cover over an area as is desired in the planting of a lawn.

Grass seeds are normally broadcast upon the ground and raked in or rolled so that they are established in co-mingled relationship with the top soil of the area planted. This method of planting grass results in an irregular and uneven distribution of the seed which is undesirable. Furthermore, by this method of seed planting substantial amounts of seed are buried in the soil at such depths as make it impossible for the seed to germinate or are left on the ground surface where they are destroyed by baking in the sun.

To overcome this, tapes in which the seed is distributed in relatively uniform manner have been proposed in the art; however, the tapes hitherto available have usually utilized adhesives to hold the seeds to a fiber material or have contemplated the cutting out of pockets in textile sheet material with the seeds inserted in these pockets. In practice, the adhesives used to hold the seeds to the fiber have been found to have an adverse effect on the germination of the seed and, in the case of carriers which use pockets which are cut from sheet material, the manufacturing process for forming the pockets and distributing the seed therein have made the product too costly to be of any practical use. Another group of seed carriers which have been known to the prior art involve the entwining of seeds into paper or fibrous yarns. While this method of holding seed has been found useful when great resistance to erosion is required or when the seed bed is on an extremely steep slope (i.e. 30° or more), such strong structures are not needed for most applications. Moreover, this type of structure is at a further cost disadvantage when the grass seed mix contains large seeds, such as the fescues, because of the large weight of paper or fiber which is required to contain such large seeds.

My invention contemplates the open lattice structure of a lofty fibrous web having interstices into which the seeds can be inserted. After inserting the seeds, I lock them into the fibrous web by compressing the lattice structure, and thus I form a seeded fiber blanket which may be laid over the area to be planted.

It is therefore the principal object of my invention to provide a relatively inexpensive means for holding the seeds in a fixed space relationship. Another object of my invention is to provide an environment for the seed which is favorable for their germination. Another object of my invention is to provide a seed-carrying medium which may be laid over the ground to provide a substantially uniform seed coverage. Another object of my invention is to provide a seed-carrying medium which, when laid over the ground and wet down, will thereafter remain permanently fixed to the ground without fastening devices. Another object of my invention is to provide a seed-carrier wherein the seed is not incased in adhesives or other chemicals which might harm the germination of the seed. Another object of my invention is to provide a seed-carrying medium devoid of adhesives which will remain as a protective shield for the seed and will act as a mulch. Another object of my invention is to provide an inexpensive method of holding the seeds in uniform spaced-apart relationship. Still further objects and advantages of the invention will appear from the following description and the appended claims.

Before explaining in detail the present invention, however, it is to be understood the invention is not limited in its application to the details described herein, since the invention is capable of other embodiments and of being practiced or carried out in various ways.

To accomplish these objects, I form an open lofty web of textile fibers and distribute the seed, substantially uniformly over the web and into the interstices between the fibers thereof. Since the web is lofty or fluffy, it contains a relatively large number of interstices in its lattice structure and the filament-like textile-length fibers impede freedom of motion of the seed in the plane of the fibers. It is in these interstices that the seeds eventually come to rest. I then compress the web by forming it into a tight roll with standard machinery. The seeds are now locked in place by the reduction of volume of the interstices in the fiber lattice.

Layers of suitable water-permeable material may be used to cover one or both sides of the fibrous web to further restrain the migration of the seed and to facilitate the unrolling of the blanket during the planting operation. I have found that a porous flexible film backing such as crepe paper, cellulose wadding or perforated methyl cellulose sheeting, or an inexpensive layer of lightweight gauze or non-woven fabric are particularly suitable for this purpose. These films are preferably substantially impervious to seed yet are sufficiently porous to allow air and water to pass through them freely. Accordingly, these films provide a barrier which limits, if not entirely eliminates, motion of the seed in a direction perpendicular to the fiber plane. Thus, the seeds are held in place by the combined action of the film and the fiber.

I consider an absorbent fiber suitable for the formation of the web because it produces a moist environment which acts as a mulch and which promotes the germination of the seed. Absorbent cotton has proven a satisfactory fiber but the technique is not restricted to this fiber since even non-absorbent fiber will give a satisfactory result if the frequency of watering is increased during the germination period.

For use in dry areas where lack of water is a major deterrent to germination, I have found it desirable to place a film over the top of a fiber mat and treat it so that it resists evaporation of water through its surface but allows rain to penetrate through its surface to the fiber's seed and seed bed below. I have found cellulose wadding treated with asphalt in a sufficient amount to reduce the evaporation rate while allowing water to pass into the holes thereof to be satisfactory for this purpose.

In selecting the backing material, care should be exercised to avoid materials which have strength great enough to impair the passage of seedling roots through the wadding. The exact selection of the backing must depend on the severity of the water shortage. This entails a compromise because some loss of seedlings, due to their inability to emerge from the backing, is tolerated in order to select a backing which will have more resistance to evaporation.

These and other features of my invention will better be understood from the following description of an embodiment thereof which is selected for the purpose of illustration and is shown in the accompanying drawings in which.

Figure 1:
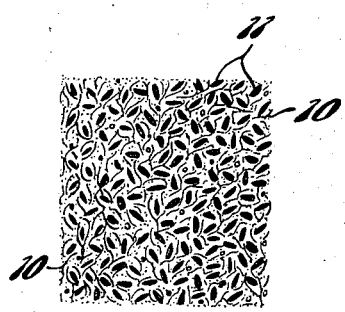
Figure 1 is a plan view of a section of fibrous web having seeds distributed in the interstices thereof.

Referring to the drawing, the numeral 10 represents a web of textile-length fibers such as is delivered from a carding machine or Garnett. As thus delivered, the web has an adequate number of interstices due to its lofty character. The web may vary somewhat in thickness and weight. I have found that webs which vary between 4 and 40 grams per square yard are entirely satisfactory for my purposes. Of course, the thickness of the web will depend upon the amount of mulch desired and the size of the seed which is to be contained in the webs. Seed 11 is distributed over the area on the surface of web 10. Since the distribution is substantially uniform and substantially all of the seeds fall into the interstices of the web, I have found it possible to lock the seed in substantially spaced-apart relationship by the simple expedient of compressing the lofty web. By this compression, the seeds become entrapped in the interstices as shown in Figure 3 and the mat as such may be used for lawn planting.

I have found it desirable to furnish sufficient seeds so that between 5 and 50 seeds per square inch are contained in the web. This amount of seed will be sufficient for most purposes, but more or less seeds may be used in the web in accordance with my invention.

In compressing the structure 10, I have found that only a moderate amount of force is required, and I have found that the compression can best be accomplished by winding the mat into a roll while the web is subjected to tension. Another satisfactory method of compressing the web is by passing it through soft-surfaced rolls. However, using the tension method of compressing the web, I find that I reduce the possibility of crushing the seed and because of this I prefer to use the tension method for compressing the web.

Figure 2:
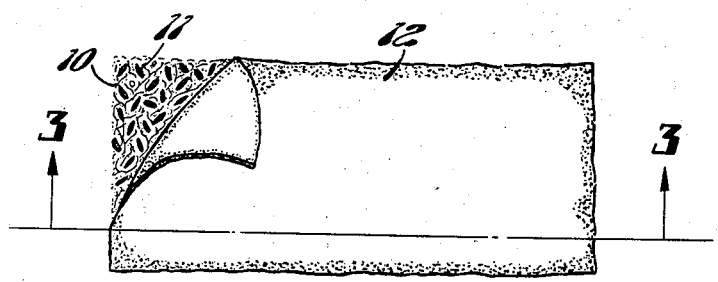
Figure 2 is a plan view of a short section of the seed blanket of my invention which is provided with a film backing and shows a portion of the film backing thereof rolled back so as to illustrate better the construction thereof.
Figure 3:
Figure 3 is a cross section of Figure 2 along the line 3—3.
Figure 4:
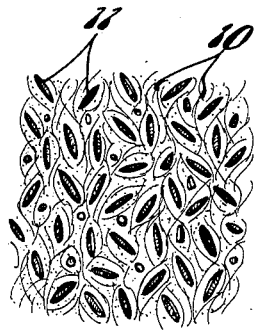
Figure 4 is an enlarged plan view of a small section of Figure 1.

In the preferred form of my invention, as shown in Figures 2 and 3, a flexible porous film backing 12 is brought in contact with the web. The backing is held in adherent relationship with the web by the mutual clinging tendencies of the fiber and the porous film backing. This adhesion may be improved somewhat by compressing the fiber web and backing together. Accordingly, when applying a backing material to the fiber web I prefer to perform the compression step after the flexible backing has been applied to the web. The flexible film backing 12 should be of reasonable thickness and preferably not more than .015" in thickness and in the practice of my invention I have found that films in the order of from .001 to .010" are superior. For my film-backing material, I prefer to use a creped paper because I find that creped paper, in combination with a fiber center, presents a seed blanket which possesses unusually desirable draping properties, a high degree of conformability (i.e., ability to conform to the ground contour) and exceptional ground tenacity (i.e., property of clinging to the ground). Also, I have found that the fiber center has a greater degree of clingingness for creped material than for non-creped material. The high-strength creped materials (creped papers that have been treated with resins to increase their strength characteristics) are most desirable since they are capable of withstanding greater abuse, but low-strength creped materials have been successfully used in the product of my invention.

In the use of my grass seed blanket, I lay the blanket over the prepared seed bed and then water it liberally. I have found that after the mat has been wetted, it clings to the ground even after drying and remains so fixed even during periods of high winds. This tendency of the blanket to cling to the ground eliminates the need for pegging the blanket to the ground or covering it with soil and thus the blanket of my invention has advantages over the products of the prior art which do not have this clinging feature.

I have found that insecticides and fertilizers may be incorporated with the product of my invention by saturating the fibers with suitable insecticides or fertilizers in liquid form after which the fibers are dried before being formed into the web. Alternatively, the insecticides and fertilizers may be sifted into the web in powder or granulated form along with the seed. The selection of suitable insecticides and fertilizers must depend upon the particular conditions in the area where the product is to be used. However, the application of potassium nitrate solution to the fibers seems to provide some increase in the germination of grass seed regardless of the conditions where tests were made. In this connection ½ of 1% (based on the weight of dry fiber) of potassium nitrate is applied in water solution to the web and seems to provide some beneficial effects as far as the germination of the seed is concerned.

Having thus disclosed my invention, I claim:

1. A method of forming a seed carrier which comprises forming a lofty fibrous web of textile length fiber, distributing seeds within the interstices of the lofty fibrous web and locking the seeds in place by reducing the volume of the interstices by compression.

2. A method of forming a seed carrier which comprises forming a lofty fibrous web of textile-length fibers, distributing seed within the interstices of said web, locking the seeds in place by compressing the web and providing a porous film backing to the web which adheres thereto by the mutual clinging tendencies of the fiber and the film.

3. A method of forming a seed carrier which comprises forming a lofty fibrous web of textile-length fibers, distributing seeds over said web and providing a flexible film backing to at least one side of said web, subjecting the web and the film to compression whereby the seeds are held in relatively stable spacial relationship by the mutual tendencies of the fiber and the flexible film to cling together.

4. A method of forming a seed carrier which comprises forming a lofty fibrous web of textile-length fibers, distributing seeds over said web and providing a cellulose wadding backing to at least one side of said web, subjecting the web and the wadding to compression whereby the seeds are held in relatively stable spacial relationship by the mutual tendencies of the fiber and the cellulose wadding to cling together.

5. An open lattice blanket for holding seeds for germination, including a non-woven web of intermeshed textile-length fibers, said fibers defining a plurality of interstices therebetween, seeds distributed throughout said web in spaced-apart relationship and positioned in some of said interstices, and the fibers defining said seed-containing interstices engaging and interlocking with said seeds, blocking the exit of said seeds from said interstices, and securing said seeds in said web.

6. The method of forming a blanket for holding seeds for germination which includes the steps of forming a fibrous web of unspun textile-length fibers having interstices and openings into said interstices defined by said fibers, at least a portion of said interstices being larger than said seeds, at least a portion of the openings into said last-named interstices being larger than said seeds, distributing seeds substantially uniformly throughout said web and into said last-named interstices, and thereafter interlocking said seeds and said fibers by reducing the volume of said web and thereby reducing the size of said seed-carrying interstices and of the openings thereto.

7. A seed carrier which comprises a web of unspun and intermeshed cellulosic textile fibers, said fibers defining a plurality of interstices therebetween and openings into said interstices, seeds distributed throughout said web and positioned in some of said interstices, the fibers defining said seed-containing interstices mechanically engaging said seeds, and the preponderance of said openings into said seed-containing interstices being smaller than said seeds.

8. The product of claim 7 wherein said seed carrier is self-sustaining in the absence of adhesive.

9. The product of claim 7 wherein a porous film is adhered to at least one side of said web.

References Cited in the file of this patent

UNITED STATES PATENTS

| | | |
|---|---|---|
| 776,139 | Luebben | Nov. 29, 1904 |
| 776,246 | Kanst | Nov. 29, 1904 |
| 1,971,504 | Pratt | Aug. 28, 1934 |
| 2,192,939 | Slayter | Mar. 12, 1940 |
| 2,243,857 | Fischer | June 3, 1941 |
| 2,648,165 | Nestor | Aug. 11, 1953 |

FOREIGN PATENTS

| | | |
|---|---|---|
| 661,767 | Germany | June 25, 1938 |
| 488,392 | Great Britain | July 6, 1938 |
| 510,136 | Great Britain | July 27, 1939 |

OTHER REFERENCES

Publications:

Cultivator and Country Gentleman (magazine), vol. 46, page 242, published April 14, 1881, article "Window Vegetable Gardens."

"Soilless Growth of Plants" (Ellis et al.), second edition, published 1947 by Reinhold (N.Y.). Only pages 56 through 59 are relied on.